United States Patent [19]

Hattori

[11] Patent Number: 5,200,611
[45] Date of Patent: Apr. 6, 1993

[54] OPTICAL SCANNING APPARATUS HAVING LIGHT SHIELDING MEMBER

[75] Inventor: Yutaka Hattori, Nagoya, Japan

[73] Assignee: Brother Kogyo Kabushiki Kaisha, Aichi, Japan

[21] Appl. No.: 772,289

[22] Filed: Oct. 7, 1991

[30] Foreign Application Priority Data

Oct. 8, 1990 [JP] Japan .................. 2-269994

[51] Int. Cl.⁵ .............................. H01J 3/14
[52] U.S. Cl. .................. 250/235; 250/236; 358/481
[58] Field of Search ............ 250/205, 235, 236, 571; 358/198, 206, 481, 494, 355; 356/445

[56] References Cited

U.S. PATENT DOCUMENTS

| | | | |
|---|---|---|---|
| 4,847,492 | 7/1989 | Houki | 250/235 |
| 5,055,663 | 10/1991 | Morimoto et al. | 250/235 |
| 5,063,292 | 11/1991 | Brueggemann | 250/236 |

Primary Examiner—David C. Nelms
Assistant Examiner—T. Davenport
Attorney, Agent, or Firm—Kane, Dalsimer, Sullivan, Kurucz, Levy, Eisele and Richard

[57] ABSTRACT

An optical scanning apparatus includes a light-shielding member, disposed between an optical deflection unit and a converging lens, for shielding a scanning beam incident on an edge portion of the converging lens on the scanning starting position side, and the apparatus converts a laser beam into a scanning beam by the optical deflection unit and raster-scans a photosensitve material with the scanning beam through the converging lens to form an image on the photosensitive material. The apparatus may further include a deflection mirror with another light-shielding member, disposed between the converging lens and the photosensitive material, for guiding the scanning beam which does not contribute to image formation immediately after starting of the scanning to a scanning beam detection unit. In the optical scanning apparatus, occurrence of a stray light can be prevented owing to the light-shielding member, whereby an image of high quality free from unevenness of an image or blurring of an image can be formed.

10 Claims, 5 Drawing Sheets

OPTICAL SCANNING APPARATUS HAVING LIGHT SHIELDING MEMBER

FIELD OF THE INVENTION

The present invention relates to an optical scanning apparatus which is used for a laser beam printer or the like, and more particularly to an optical scanning apparatus for preventing occurrence of a stray light.

BACKGROUND OF THE INVENTION

As one example of optical scanning apparatuses used for a laser beam printer, etc., conventionally known is an optical scanning apparatus including a semiconductor laser, a collimator lens and a rotary polygon mirror disposed in a straight line and further including a converging lens and a photosensitive material disposed on other straight line In this conventional optical scanning apparatus, the semiconductor laser is a laser beam source, and the laser beam source emits a laser beam towards the collimator lens. The collimator lens is located about halfway between the semiconductor laser and the rotary polygon mirror, and serves to convert the laser beam emitted from the semiconductor laser into parallel rays. The rotary polygon mirror is rotated in one direction, and a laser beam reflected on one surface of the polygon mirror is subjected to deflection scanning by the rotation thereof so as to be guided to the converging lens. The converging lens has f·θ characteristics, and functions not only to converge a laser beam into an extremely small spot to irradiate therewith a photosensitive material of a drum shape made of a photoconductive material but also to convert the deflection scanning at a predetermined rotational speed into a linear scanning at a predetermined linear speed. Thus converted laser beam raster-scans the rotating photosensitive material to form a two-dimensional electrostatic latent image thereon. A deflection mirror is disposed on the scanning starting position side between the converging lens and the photosensitive material to guide a laser beam going to the photosensitive material through the converging lens to a synchronous detector. The synchronous detector serves to adjust timing of image formation.

U.S. Pat. No. 4,847,492 given to Youji Houki in Jul. 11, 1989, discloses an optical beam scanner including a deflection means having a mirror surface on which an optical beam emitted from an optical light source is applied, the beam being deflected by rotating the mirror surface about an axis of the deflection means; an f·θ lens for performing an scanning operation at a uniform speed on a scanning surface; an optical compensation means for compensating for an inclination of the mirror surface of the deflection means, the optical compensation means including a cylinder lens or a cylinder mirror disposed in a space between the f·θ lens and the scanning surface; and a detection means for receiving the deflected optical beam and detecting a scanning starting position of the optical beam. The detection means is disposed between the f·θ lens and the optical compensation means.

In the above-mentioned optical scanning apparatuses, the synchronous detector or the detection means for adjusting the scanning starting position is arranged on a scanning beam path which does not contribute to image formation. That is, a total scanning region of the laser beam includes a region for the synchronous detector not contributing to the image formation in addition to a region contributing to the image formation on the photosensitive material. During one scanning period, accordingly, there are present not only a period contributing to the image formation (i.e., period in which an image is formed) but also a period not contributing to the image formation (i.e., period in which an image is not formed).

However, if an edge surface of the converging lens or the f·θ lens in the scanning direction or a side surface of the deflection mirror is irradiated with a laser beam in the region not contributing to image formation, a stray light occurs, and the stray light is sometimes applied onto the photosensitive material as a light other than a light of image information. The stray light applied onto the photosensitive material causes unevenness in image density or blurring of an image, resulting in deterioration of an image quality.

SUMMARY OF THE INVENTION

An object of the present invention is to provide an optical scanning apparatus having a simple structure which can prevent occurrence of a stray light caused by irradiating an edge surface of a converging lens with a laser beam and can form an image of high quality free from unevenness in density or blurring.

According to the present invention, there is provided an optical scanning apparatus for converting a laser beam into a scanning beam by an optical deflection means and for raster-scanning a photosensitive material with the scanning beam through a converging lens to form an image on the photosensitive material, which includes a light-shielding member, disposed between the optical deflection means and the converging lens, for shielding the scanning beam incident on an edge portion of the converging lens, the edge portion being located on the scanning starting position side. The optical scanning apparatus of the invention may further include a deflection mirror, disposed between the converging lens and the photosensitive material, for guiding a scanning beam not contributing to image formation immediately after starting of the scanning to a scanning beam detection means.

In the optical scanning apparatus of the invention, a laser beam emitted from a laser beam source is converted into a scanning beam, and the scanning beam is applied onto the photosensitive material through the converging lens. Between the optical deflection means and the converging lens is disposed a light-shielding member for shielding a scanning beam which is incident on an edge portion of the converging lens, the edge portion being located on the scanning starting position side. Therefore, the scanning beam incident on the above-mentioned edge portion of the converging lens is blocked by the light-shielding member. Accordingly, occurrence of a stray light can be prevented, and an image of high quality free from unevenness of an image or blur of an image caused by the stray light can be formed.

Further objects, features and other aspects of this invention will be understood from the following detailed description of the preferred embodiment with reference to the drawings.

DETAILED DESCRIPTION OF THE PREFERRED EMBODIMENTS

Figure 1:
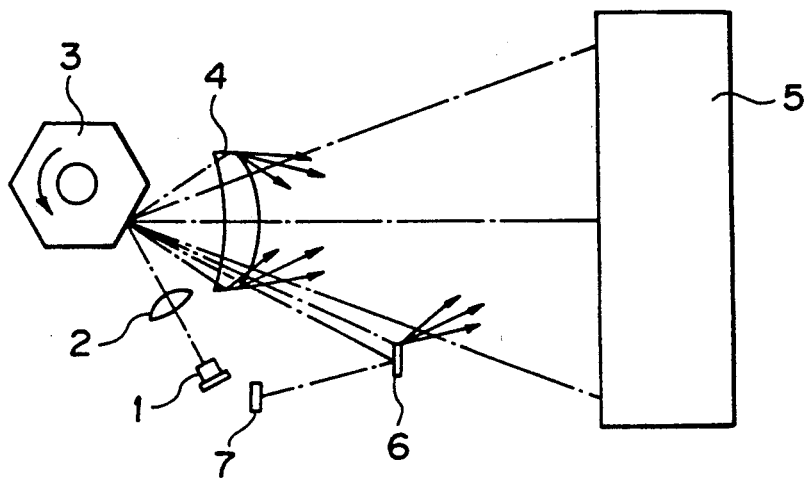
FIG. 1 is a schematic view showing a conventional optical scanning apparatus.

The embodiments of the present invention are now described in detail referring to the attached drawings.

For better understanding of the present invention, first, a conventional optical scanning apparatus will be explained with reference to FIG. 1. The conventional optical scanning apparatus is constituted of a semiconductor laser 1 for emitting laser beams, a collimator lens 2 for converting the laser beams into parallel rays, a rotary polygon mirror 3 on which the paralle rays are reflected, a converging lens 4 for converging the reflected rays, a photosensitive material 5 on which a latent image is formed, a deflection mirror 6 for deflecting a part of beams reflected from the polygon mirror and a synchronous detector 7 for detecting the deflected beams.

In this optical scanning apparatus, a laser beam is modulated by, for example, a scanner controller in accordance with image signals, and is output from the semiconductor laser 1. The laser beam output as above goes through the collimator lens 2, the rotary polygon mirror 3 and the converging lens 4, and raster-scans the photosensitive material 5 to form an electrostatic latent image on the photosensitive material 5.

The scanner controller sends image signals with a fixed timing after the laser beam is applied on the synchronous detector 7, to keep the same starting position of image formation on the photosensitive material 5.

In the conventional optical scanning apparatus, if an edge surface of the converging lens 4 and a side surface of the deflection mirror 6 are irradiated with a laser beam, a stray light occurs as indicated by arrows in FIG. 1.

Figure 2:
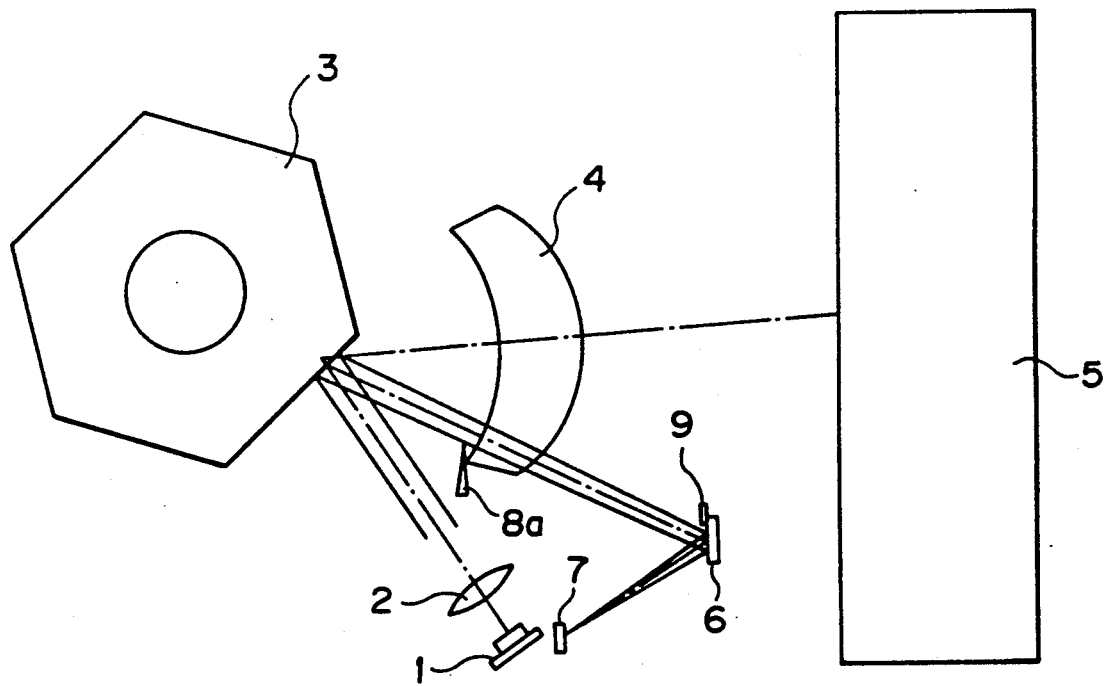
FIG. 2 is a view showing one embodiment of an optical scanning apparatus according to the invention.

FIG. 2 shows a structure of an optical scanning apparatus which is one embodiment of the present invention.

As shown in FIG. 2, the optical scanning apparatus includes a semiconductor laser 1, a collimator lens 2, a rotary polygon mirror 3, a converging lens 4, a photosensitive material 5, a deflection mirror 6 and a synchronous detector 7. Further, between the rotary polygon mirror 3 and the converging lens 4, a light-shielding plate 8a (i.e., a first light-shielding member) is arranged at an edge portion of the converging lens 4 on the scanning starting position side in such a manner that the edge portion of the converging lens 4 is shielded with the light-shielding plate 8a. Furthermore, between the deflection mirror 6 and the converging lens 4, other light-shielding plate 9 (i.e., a second light-shielding member) is arranged at an edge portion of the deflection mirror 6 on the side of the center of the converging lens 4 in such a manner that a beam directed to the edge portion of the deflection mirror 6 is shielded with the light-shielding plate 9.

The converging lens 4 has a size which is large enough to cover the scanning region contributing to the image formation (i.e., a region wherein an image is formed).

The tip of the light-shielding plate 8a (the first light-shielding member) on the side of the center of the converging lens 4 is so positioned that the scanning beam reflected from the rotary polygon mirror 3 toward the deflection mirror 6 is not shielded.

Figure 3:
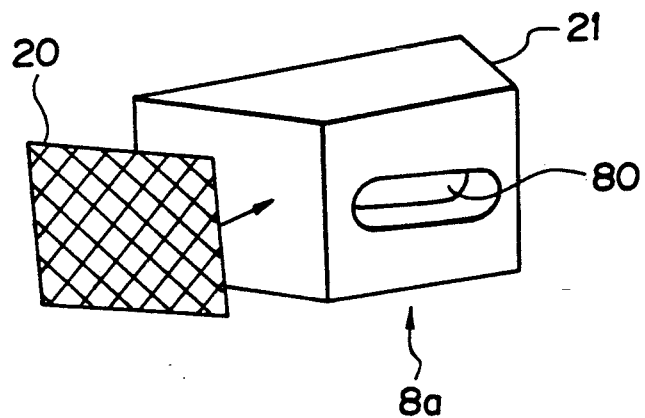
FIG. 3 is a view showing a structure of a light-shielding member in the invention.

As shown in FIG. 3, the light-shielding plate 8a is constituted of a support member 21 made of aluminum and a light-shielding and reflection-preventing member 20 made of, for example, black felt, adherent to the support member 21.

Figure 4:
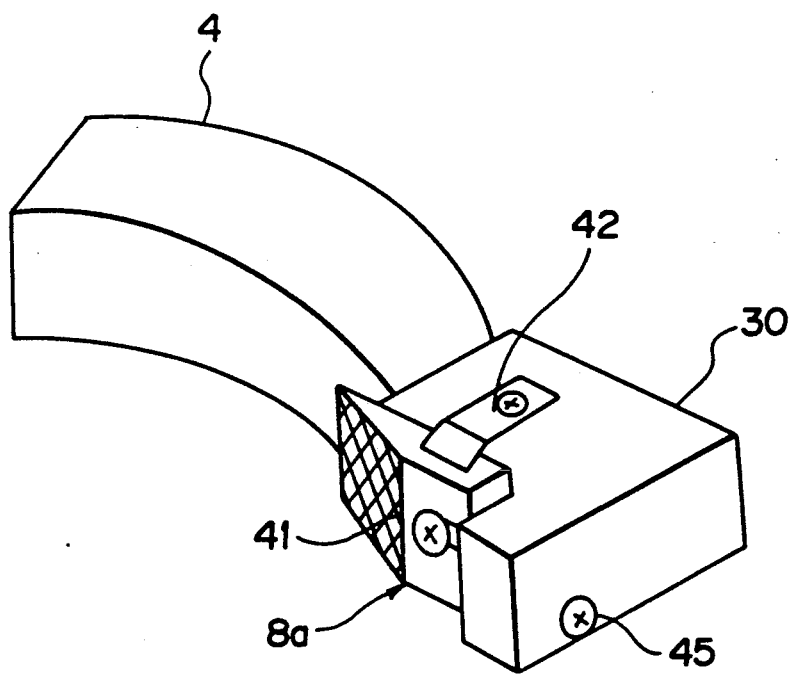
FIG. 4 is a perspective view showing a relationship between a light-shielding member and a converging lens in the embodiment of the invention.

As shown in FIG. 4, the light-shielding plate 8a is fixed to a lens holder 30 for holding the edge portion of the converging lens 4.

Figure 5:
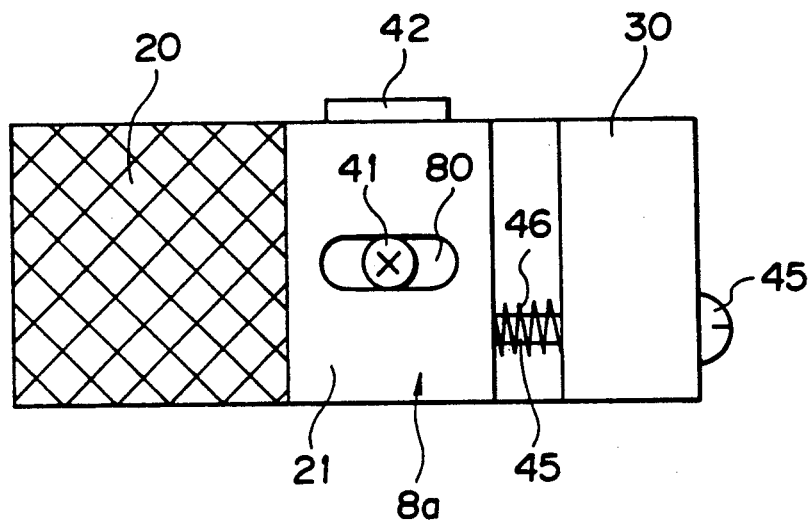
FIG. 5 is a plan view showing a relationship between a light-shielding member and a lens holder in the embodiment of the invention.

FIG. 5 shows an alignment mechanism of the light-shielding plate 8a.

As shown in FIG. 5, the light-shielding plate 8a is fixed to the lens holder 30 in close contact with the holder 30 by means of a fixing screw 41 and a holding spring 42 for holding the upper face of the plate 8a. The light-shielding plate 8a is provided with a guiding hole 80 in an oval shape. The light-shielding plate 8a can be moved within a length of the guiding hole 80 for receiving the fixing screw 41 which is fitted to the lens holder 30 through the guiding hole 80. Further, on a side surface of the light-shielding plate 8a is provided a tapped hole 81, into which is screwed an adjust screw 45 through a compression spring 46, the adjust screw 45 being inserted through a hole 82 formed in a protruded part 30a of the lens holder 30.

Figure 6:
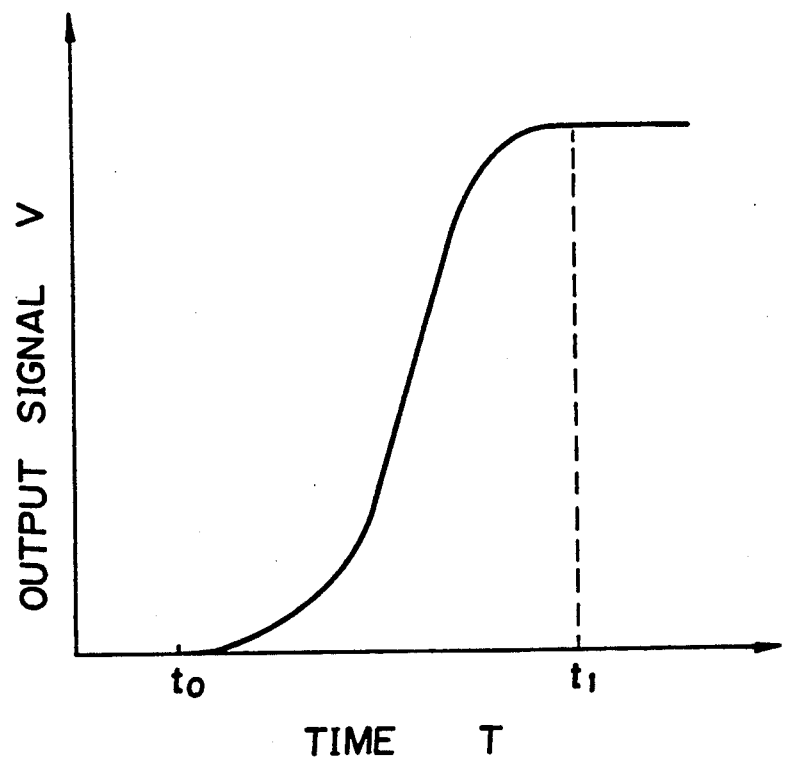
FIG. 6 is a view showing one example of variation of output signals from a synchronous detector with time in the embodiment of the invention.

The light-shielding plate 8a is adjusted in its position to be fitted to the lens holder 30 in the following manner. That is, the rotary polygon mirror 3 is rotated keeping the laser beam source on, and it is ascertained that a laser beam is applied on the synchronous detector 7 by observing output signals from the detector 7, as shown in FIG. 6. After the incident laser beam is confirmed, the adjust screw 45 is turned to move the light-shielding plate 8a along a guiding surface 30b (FIG. 4) of the lens holder 30. The fixing screw 41 is tightened to fix the light-shielding plate 8a to the lens holder 30 slightly before the rising time $(t_1-t_0)$ of the output signal shown in FIG. 6 starts to change.

Figure 7:
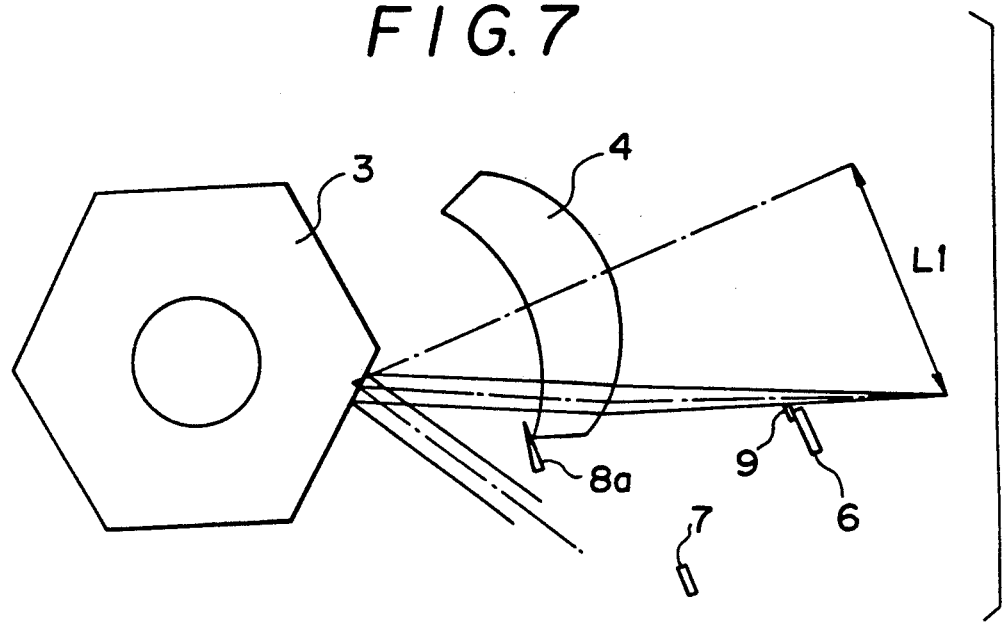
FIG. 7 is a view showing a state of laser beams at the time when the scanning is started in the embodiment of the invention.

In the optical scanning apparatus shown in FIG. 2, an edge portion of a light-shielding plate 9 (the second light-shielding member) on the side of the center of the converging lens 4 is so located that the scanning beam passing through the converging lens 4 toward the photosensitive material 5 within the scanning region contributing to the image formation is not shielded, and other edge portion of the light-shielding plate 9 on the side of the synchronous detector 7 is so located that the scanning beam passing through the converging lens 4 toward approximately the center of the deflection mirror 6 is not shielded. In the concrete, as shown in FIG. 7, the edge portion of the light-shielding plate 9 on the side of the center of the converging lens 4 is so located that the laser beam directed to a fixed range within the scanning region contributing to the image formation is not shielded therewith, the fixed range being determined by a distance $L_1$ from the center of an image on an image surface. Further, other edge portion of the light-shielding plate 9 is so located that the incident beam on the synchronous detector 7 is not shielded therewith. The above-mentioned distance $L_1$ is a length obtained by addition of allowance $\Delta L$ to a half length of W (W is a length of scanning region contributing to the image formation on the photosensitive material). That is, the distance $L_1$ can be obtained by the following formula:

$$L_1 = W/2 + \Delta L$$

The allowance $\Delta L$ generally is approximately 2 mm. This light-shielding plate 9 has the same structure as that of the light-shielding plate 8a, and is position-adjustably fitted to an edge portion of the deflection mirror 6 in the same manner as that of the light-shielding plate 8a.

In the optical scanning apparatus, an optical deflection means is constituted of the rotary polygon mirror 3, and a scanning beam detection means is constituted of the synchronous detector 7.

The operation of the optical scanning apparatus of the invention having the above-mentioned structure will be described below.

A laser beam emitted from the semiconductor laser 1 passes through the collimator lens 2 to reach the rotary polygon mirror 3, and is deflected by the rotary polygon mirror 3 to be incident on the converging lens 4. The laser beam incident on an edge surface of the converging lens 4 is blocked by the light-shielding plate 8a, to prevent occurrence of a stray light due to the laser beam incident on the edge surface of the converging lens 4.

The laser beam moves in the scanning direction in accordance with rotation of the rotary polygon mirror 3. The beam passing near the edge portion of the light-shielding plate 8a on the side of the center of the converging lens 4 is incident on the deflection mirror 6 through the converging lens 4. This laser beam is reflected by the deflection mirror 6 to be incident on the synchronous detector 7. In a predetermined period after detection of the laser beam by the synchronous detector 7, the laser beam is modulated by a modulation means based on image data, and thus modulated laser beam is output from the semiconductor laser 1.

The laser beam which further moves in the scanning direction reaches the light-shielding plate 9, and this laser beam is blocked by the light-shielding plate 9, whereby, occurrence of a stray light due to the laser beam incident on the edge portion of the deflection mirror 6 is prevented.

The laser beam furthermore moves in the scanning direction, then passes by an edge portion of the light-shielding plate 9 on the side of the center of the converging lens 4, and is applied onto the photosensitive material 5. The photosensitive material 5 is raster-scanned with the laser beam modulated as above in accordance with the rotation of the rotary polygon mirror 3, to form an electrostatic latent image on the photosensitive material 5.

Figure 8:
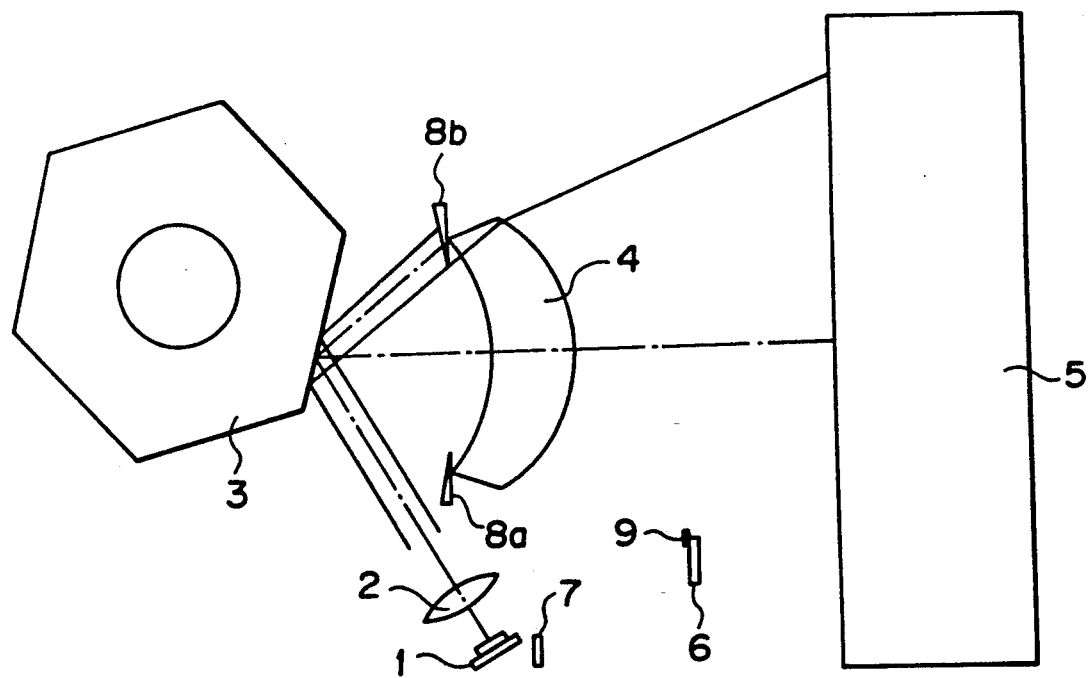
FIG. 8 is a view showing a structure of other embodiment of the invention.

FIG. 8 shows a structure of other embodiment of the optical scanning apparatus according to the present invention.

Figure 9:
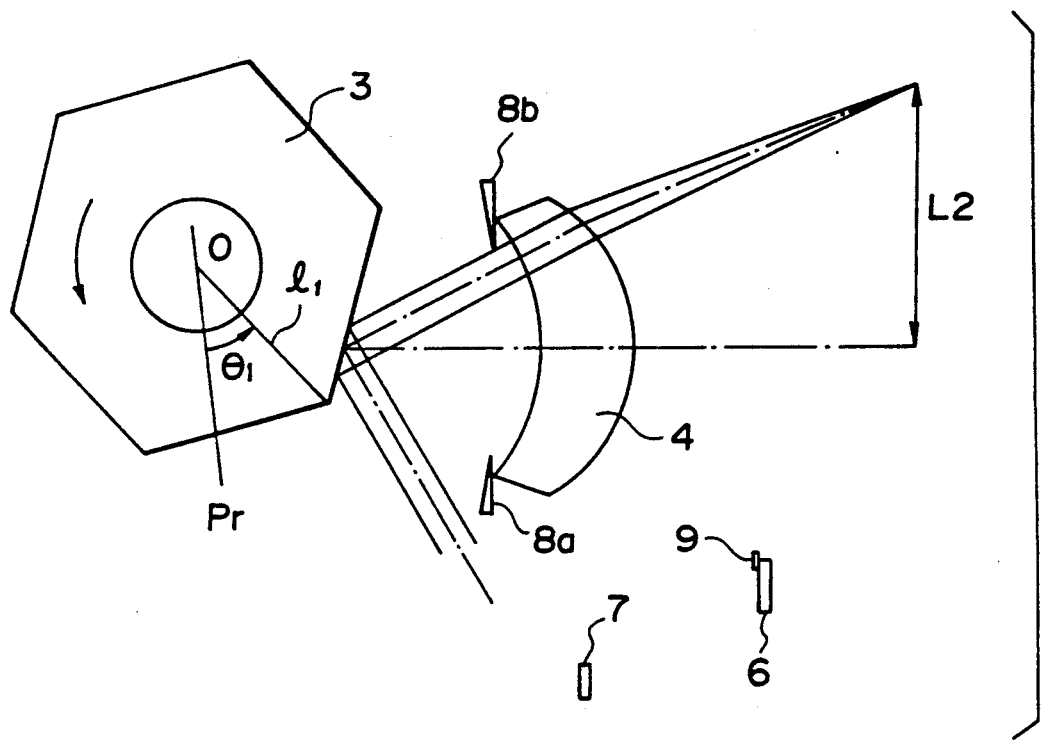
FIG. 9 is a view showing a state of laser beams on one surface of a rotary polygon mirror of the optical scanning apparatus shown in FIG. 8 at the time when the scanning is finished.

As shown in FIG. 8, the optical scanning apparatus of this embodiment is further provided with a light-shielding plate 8b (a third light-shielding member) in addition to the light-shielding plate 8a (the first light-shielding member). This light-shielding plate 8b has the same structure as that of the light-shielding plate 8a, and is fitted to the edge portion of the converging lens 4 in the same manner as that of the light-shielding plate 8a. In the concrete, the light-shielding plate 8b is arranged between the rotary polygon mirror 3 and the converging lens 4 in such a manner that a laser beam directed to the edge portion of the converging lens 4 on its scanning finishing position side is shielded with the light-shielding plate 8b, as shown in FIG. 8. The edge portion of the light-shielding plate 8b on the side of the center of the converging lens 4 is so located that the scanning beam reflected from the rotary polygon mirror 3 toward the photosensitive material 5 and going through the converging lens 4 within the scanning region contributing to the image formation is not blocked therewith. In more concrete, as shown in FIG. 9, the edge portion of the light-shielding plate 8b on the side of the center of the converging lens 4 is so located that the laser beams directed to a fixed range within the scanning region contributing to the image formation is not blocked, the fixed range being determined by a distance $L_2$ from the center of an image on an image surface on the scanning finishing position side. The above-mentioned distance $L_2$ is, likewise the aforementioned distance $L_1$, a length obtained by addition of allowance $\Delta L$ to a half length of W (W is a length of scanning region contributing to the image formation). That is, the distance $L_2$ can be obtained by the following formula:

$$L_2 = W/2 + \Delta L$$

The size of the converging lens has a size which is large enough to cover the scanning region contributing to the image formation, similarly to the size of the converging lens 4 of the optical scanning apparatus shown in FIG. 2. Concretely, the converging lens 4 is required to have at least such a diameter that even if the two light-shielding plates 8a and 8b are provided on the respective edge portions of the converging lens 4, a beam passing between the two light-shielding plates 8a and 8b can scan entirely the scanning region contributing to the image formation.

In the optical scanning apparatus of this embodiment, a laser beam directed to a region other than the region contributing to the image formation is blocked by the light-shielding plate 8b. Therefore, occurrence of a stray light caused by a laser beam incident on the edge portion of the converging lens 4 on the scanning finishing position side can be prevented.

The same effect as given by the light-shielding plate 8b can be also obtained by turning off the laser beam source for a certain period of time.

Figure 10:
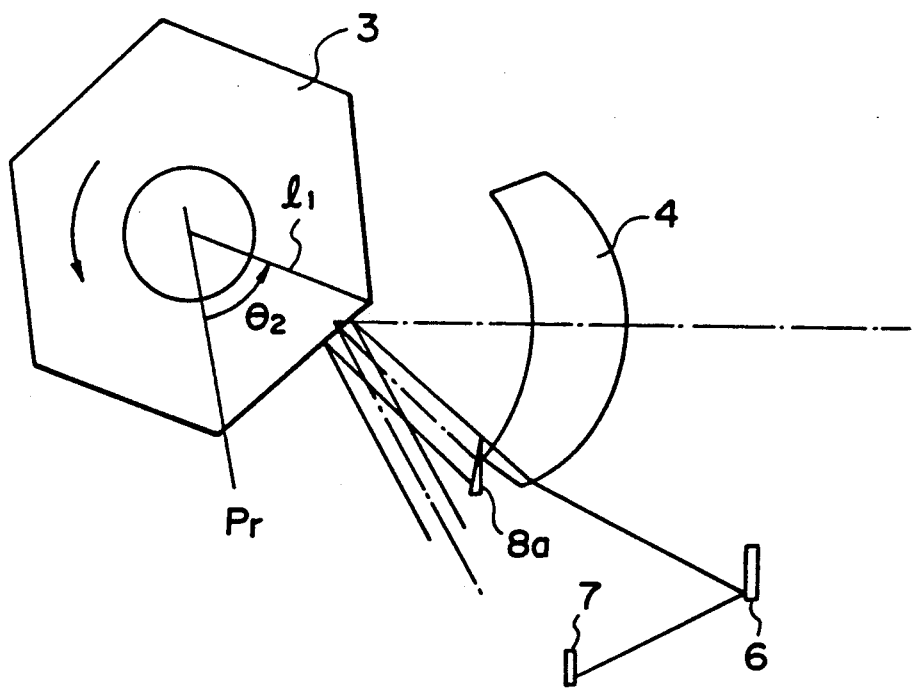
FIG. 10 is a view showing a state of a bundle of laser beams at the time when the next scanning is started from the state of laser beams shown in FIG. 9.

In detail, if the rotation angle of the rotary polygon mirror 3 at the time when the scanning is finished is determined at an angle of $\theta_1$ between a line $l_1$ extended on the center 0 of the mirror 3 and a corner A thereof and a reference angular position $P_r$ shown in FIG. 9, the laser beam is incident on the synchronous detector 7 when the polygon mirror 3 is further rotated from a position shown in FIG. 9 in the counterclockwise direction. The rotation angle of the rotary polygon mirror 3 at that time is an angle of $\theta_2$ shown in FIG. 10. Thereafter, the beam scans the photosensitive material 3 until the polygon mirror 3 takes the position shown in FIG. 8.

Accordingly, if the semiconductor laser 1 as a laser beam source is turned off while the rotation angle of the rotary polygon mirror 3 varies from $\theta_1$ to $\theta_2$, any laser beam is not applied onto the edge surface of the converging lens 4 on the scanning finishing position side, even when the above-mentioned light-shielding plate 8b is not provided. That is, the same effect as given by the light-shielding plate 8b can be obtained.

For turning off the semiconductor laser 1 (laser beam source) while the rotation angle of the rotary polygon mirror 3 varies from $\theta_1$ to $\theta_2$, there is provided, for example, a light source-controlling means C (FIG. 10) to control the ON-OFF timing of the semiconductor laser 1 in accordance with the pulse number counted by a timer.

According to the invention, as described above in detail, occurrence of a stray light caused by a laser beam incident on the edge portion of the converging lens and the edge portion of the deflection mirror can be effectively prevented by the light-shielding members. Accordingly, the present invention can provides an optical scanning apparatus of a simple structure capable of preventing occurrence of a stray light and forming an image of high quality.

What is claimed is:

1. An optical scanning apparatus for converting a laser beam into a scanning beam by an optical deflection means and for raster-scanning a photosensitive material with the scanning beam through a converging lens to form an image on the photosensitive material, said optical scanning apparatus comprising a lightshielding member disposed between said optical defection means and said converging lens for shielding the scanning beam incident on an edge portion of said converging lens, said edge portion being located on a scanning starting position side.

2. An optical scanning apparatus as claimed in claim 1, further comprising a deflection mirror, disposed between said converging lens and said photosensitive material, for guiding a scanning beam immediately after starting of the scanning to a scanning beam detection means.

3. An optical scanning apparatus as claimed in claim 2, further comprising a light-shielding member, disposed between said deflection mirror and said converging lens, for shielding the scanning beam incident on an edge portion of said deflection mirror, said edge portion being located on a side of the center of said converging lens.

4. An optical scanning apparatus as claimed in claim 1, further comprising a light-shielding member, disposed between said optical deflection means and said converging lens, for shielding the scanning beam incident on an edge portion of the converging lens, said edge portion being located on a scanning finishing position side.

5. An optical scanning apparatus as claimed in claim 3, further comprising a light-shielding member, disposed between said optical deflection means and converging lens, for shielding the scanning beam incident on an edge portion of the converging lens, said edge portion being located on a scanning finishing position side.

6. An optical scanning apparatus as claimed in claim 1, further comprising a laser beam source for generating a laser beam which is irradiated to said optical deflection means and wherein said optical deflection means comprises a rotary polygon mirror, said scanning beam detection means comprises a synchronous detector, and said laser beam source is turned off for a certain period of time in which rotation angle of said rotary polygon mirror is varied from a certain rotation angle to another rotation angle, said certain rotation angle being an angle of said rotary polygon mirror at a time when a scanning is finished, said another rotation angle being an angle of said rotary polygon mirror at a time when the scanning is started.

7. An optical scanning apparatus as claimed in claim 2, wherein said optical deflection means comprises a rotary polygon mirror, said scanning beam detection means comprises a synchronous detector, and a laser beam source is turned off for a certain period of time in which rotation angle of said rotary polygon mirror is varied from a certain rotation angle to another rotation angle, said certain rotation angle being an angle of said rotary polygon mirror at a time when a scanning is finished, said another rotation angle being an angle of said rotary polygon mirror at a time when the scanning is started.

8. An optical scanning apparatus as claimed in claim 1, wherein said light-shielding member comprises a light-shielding plate which is position-adjustably fitted to a lens holder for holding said converging lens.

9. An optical scanning apparatus as claimed in claim 4, wherein said light-shielding member comprises a light-shielding plate which is position-adjustably fitted to a lens holder for holding said converging lens.

10. An optical scanning apparatus as claimed in claim 3, wherein said light-shielding member is position-adjustably fitted to said deflection mirror.

* * * * *